(12) United States Patent
Cummings et al.

(10) Patent No.: US 6,330,802 B1
(45) Date of Patent: Dec. 18, 2001

(54) REFRIGERANT LOSS DETECTION

(75) Inventors: Robert W. Cummings, Bedford; Thien D. Ta, Saginaw, both of TX (US)

(73) Assignee: Behr Climate Systems, Inc., Forthworth, TX (US)

( * ) Notice: Subject to any disclaimer, the term of this patent is extended or adjusted under 35 U.S.C. 154(b) by 0 days.

(21) Appl. No.: 09/510,703

(22) Filed: Feb. 22, 2000

(51) Int. Cl.[7] ....................................................... F25B 49/02
(52) U.S. Cl. .................................. 62/129; 62/126; 62/127
(58) Field of Search .............................. 62/125, 126, 127, 62/129, 209, 208, 157, 158, 231

(56) References Cited

U.S. PATENT DOCUMENTS

| | | | |
|---|---|---|---|
| 3,803,863 | 4/1974 | Jednacz et al. | 62/209 |
| 4,506,518 | 3/1985 | Yoshikawa et al. | 62/180 |
| 4,507,935 | 4/1985 | Madarame et al. | 62/227 |
| 4,545,212 | 10/1985 | Noda | 62/129 |
| 4,563,878 | 1/1986 | Baglione | 62/115 |
| 4,677,830 | 7/1987 | Sumikawa et al. | 62/126 |
| 4,706,470 | 11/1987 | Akazawa et al. | 62/209 |
| 4,745,765 | 5/1988 | Pettitt | 62/129 |
| 4,753,083 | 6/1988 | Sato | 62/209 |
| 4,794,762 | 1/1989 | Orth et al. | 62/203 |
| 4,848,100 | 7/1989 | Barthel et al. | 62/212 |
| 5,009,074 | 4/1991 | Goubeaux et al. | 62/115 |
| 5,009,076 | 4/1991 | Winslow | 62/129 |
| 5,150,584 | 9/1992 | Tomasov et al. | 62/209 |
| 5,201,862 | 4/1993 | Pettitt | 62/157 |
| 5,209,076 | 5/1993 | Kauffman et al. | 62/126 |
| 5,251,453 | 10/1993 | Stanke et al. | 62/126 |
| 5,457,965 | * 10/1995 | Blair et al. | 62/129 |
| 5,533,353 | 7/1996 | Baker et al. | 62/227 |
| 5,546,756 | 8/1996 | Ali | 62/204 |
| 5,647,222 | * 7/1997 | Sarakinis | 62/126 X |
| 5,987,903 | * 11/1999 | Bathla | 62/127 X |

OTHER PUBLICATIONS

"A Microprocessor Controller and Sensor for Refrigerant Low Charge Detection in an Air Conditioning System" Presented Dec. 4–6, 2000 Derek Y. Kamemoto, Peder L. Hamberg and Gary P. Hansen Red Dot Corporation 2000–01–3444.

* cited by examiner

*Primary Examiner*—Harry B. Tanner
(74) *Attorney, Agent, or Firm*—Howard & Howard

(57) ABSTRACT

A method for detecting a low level of refrigerant circulating through a motor vehicle refrigerant circuit having a compressor (12), a condenser (14), an evaporator (16), and an accumulator (18), includes detecting a partial loss of a refrigerant fluid by measuring the temperature difference of the refrigerant fluid between an evaporator inlet and an evaporator outlet. The method further includes detecting a complete loss of refrigerant by measuring the pressure of the refrigerant in the liquid phase between the condenser (14) and the evaporator (16). The temperature and pressure measurements are converted to engineering units and then compared to predetermined engineering units that correspond to separate ranges of ambient temperatures for determining the if the refrigerant level is low.

11 Claims, 2 Drawing Sheets

"TVX-BASED SYSTEM"

REFRIGERANT LOSS DETECTION

BACKGROUND OF THE INVENTION

1. Field of the Invention

The subject invention relates to a method for detecting a loss of refrigerant in a vehicle air conditioning system.

2. Description of the Prior Art

Air conditioning systems for motor vehicles typically include a refrigerant circuit having a compressor, a condenser, an evaporator, an accumulator, and a compressor. The compressor includes a motor for circulating the refrigerant through the circuit. The refrigerant often includes a lubricating oil for lubricating the compressor during operation. The compressor can overheat and burn out if the refrigerant and the lubricating oil become depleted.

Heavy duty trucks require durable air conditioning systems for cooling the operator cabin. These air conditioning systems are required to operate consistently over hundreds of thousands of miles. To meet this requirement, a loss of refrigerant from the circuit must be identified before the compressor can be damaged from low refrigerant. Therefore, a need exist for accurately detecting a change in refrigerant level within the circuit before the compressor can be damaged from low levels of refrigerant.

One such device for detecting low refrigerant levels is disclosed in U.S. Pat. No. 5,457,965 to Blaire et al. The Blair et al patent discloses an apparatus for detecting a partial loss of a refrigerant fluid by measuring the temperature difference of the refrigerant fluid between an evaporator inlet and an evaporator outlet. A controller measures the temperature difference against a predetermined value and interrupts power to compressor at a low refrigerant charge. Alternatively, the Blair patent discloses an apparatus for detecting a low refrigerant level by calculating saturation temperature of the refrigerant by measuring temperature and pressure in the gas phase between the compressor and the condenser. The calculated saturation temperature is compared with a predetermined saturation temperature for determining if a superheat condition exists. A third alternative disclosed in the Blair et al patent includes a pressure switch, which is located between the accumulator and the compressor. A clutch is cycled at preset low and high pressures of refrigerant as measured in the gas phase between the accumulator and the compressor.

Although the disclosed concepts provide protection for the compressor, several shortcomings exist. First, the superheat calculation requires significant computer resources due to the complexity of the calculation. Also, simply determining the temperature difference between the inlet and the outlet of the evaporator, without more, can give inaccurate superheat readings reducing the effectiveness of the system. Further, no provisions are made for determining partial loss of refrigerant, which would ultimately lead to required maintenance, but would allow continued operation of the air conditioning system. Still further, measuring the refrigerant pressure in the gas phase has not proven to be an accurate indicator of low refrigerant charge at broad ranges of ambient temperatures.

A need exists for a refrigerant loss detection method that would accurately detect a complete loss of refrigerant as well as a partial loss of refrigerant. A method for refrigerant loss detection that would both provide a visual signal of refrigerant charge and terminate power to the compressor upon critically low refrigerant charge would be preferable to the prior art.

SUMMARY OF THE INVENTION AND ADVANTAGES

The subject invention provides a method for detecting a low level of refrigerant circulating through a motor vehicle refrigerant circuit having a compressor, a condenser, an evaporator, and an accumulator. The method includes detecting a partial loss of a refrigerant fluid by measuring the temperature difference of the refrigerant fluid between an evaporator inlet and an evaporator outlet, and is characterized by detecting a complete loss of refrigerant by measuring the pressure of the refrigerant in the liquid phase between the condenser and the evaporator.

By detecting a partial loss of refrigerant, a visible signal can be provided before the refrigerant falls to a level that requires power to the compressor be terminated for preventing the compressor from being damaged. This allows for maintenance to be scheduled rather than having emergency repairs performed while in route. By measuring the temperature change across the evaporator in unison with the refrigerant pressure in the liquid phase, a simple algorithm can be developed to accurately measure refrigerant loss while not utilizing significant amount of computer resources. Additionally, by measuring the refrigerant pressure in the liquid phase eliminates the need for performing a superheat calculation. By eliminating the superheat calculation, a control algorithm can be developed that is simplified. This provides more consistent outputs from the algorithm at a broader range of ambient temperatures thereby providing more consistent measurements of refrigerant charge level.

BRIEF DESCRIPTION OF THE DRAWINGS

Other advantages of the present invention will be readily appreciated as the same becomes better understood by reference to the following detailed description when considered in connection with the accompanying drawing wherein.

DETAILED DESCRIPTION OF THE PREFERRED EMBODIMENT

Figure 1:
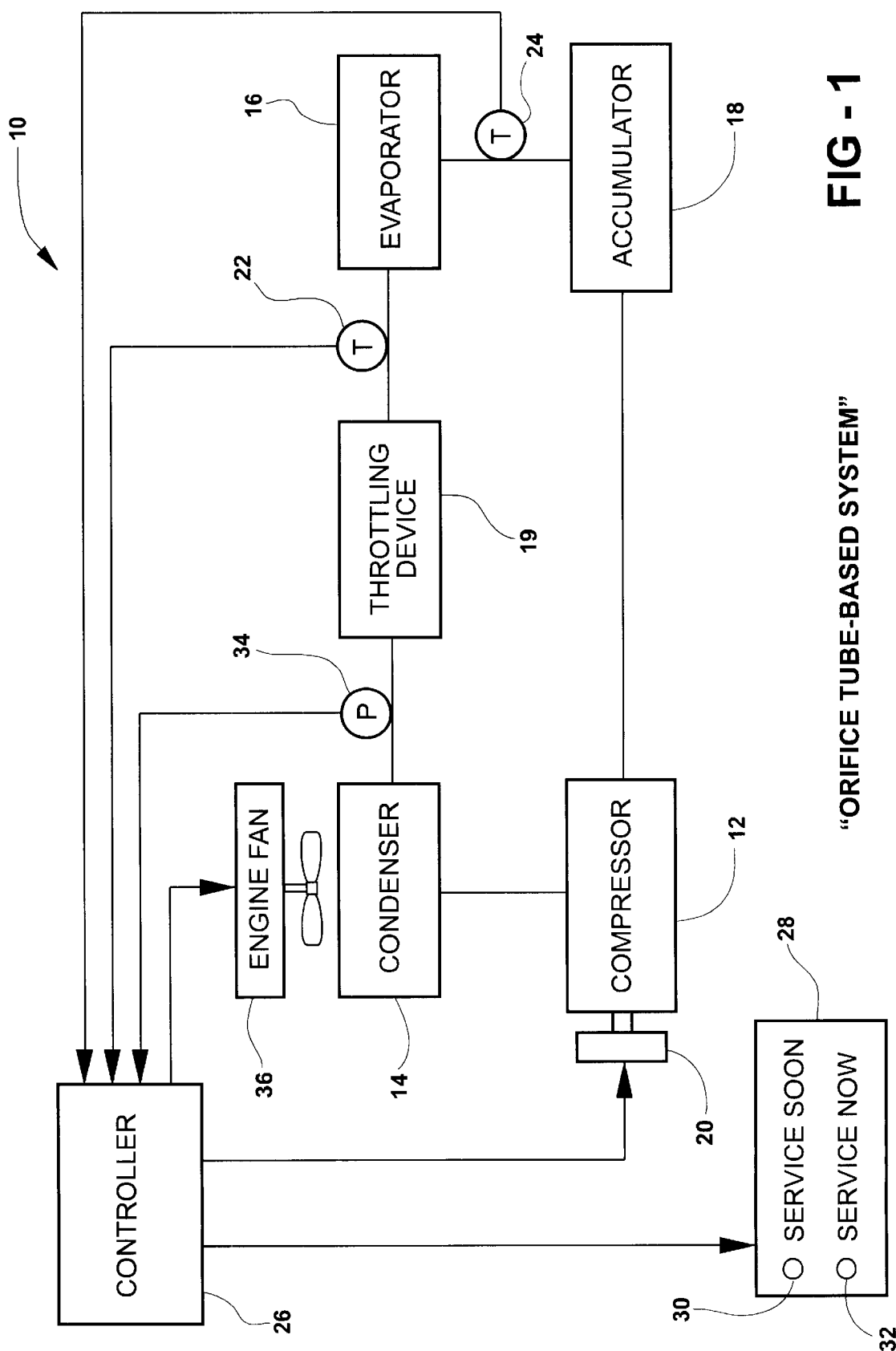
FIG. 1 is a schematic view of the subject invention for detecting a low level of a refrigerant circulating through an air conditioning system having an orifice tube based apparatus represented as a throttling device known as a CCOT system.

Referring to FIG. 1, wherein like numerals indicate like or corresponding parts, a schematic view is generally shown at 10 of an apparatus for detecting a low level of refrigerant circulating through a motor vehicle refrigerant circuit having a compressor 12, a condenser 14, an evaporator 16, and an accumulator 18. A throttling device 19 is positioned between the condenser 14 and the evaporator 16. The throttling device 19 comprises an orifice tube as is known in the art. The compressor 12 includes a clutch 20 for activating and deactivating the compressor 12. The apparatus 10 includes an inlet thermistor 22 located in the refrigerant circuit proximate an inlet of the evaporator 16 and an outlet thermistor 24 located in the circuit proximate an outlet of the evaporator 16. The thermistors 22,24 are in communication with a controller 26 for relaying to the controller 26 temperature measurements of the refrigerant.

The controller 26 is in communication with a display panel 28 for providing a visual signal in response to the comparison between a calculated charge index and a predetermined charge index. The visual signal displays a service soon signal 30 for indicating a partial loss of refrigerant and a service now signal 32 for indicating a critical loss of refrigerant. This communication may also be transmitted digitally on a vehicle multiplexing bus (not shown).

A pressure transducer 34 is located in the circuit between the condenser 14 and the evaporator 16 for measuring the pressure of the refrigerant in the liquid phase. More specifically, the pressure transducer 34 is located between the condenser 14 and the throttling device 19. The pressure transducer is in communication with the controller 26 for relaying pressure measurements to the controller 26.

Figure 2:
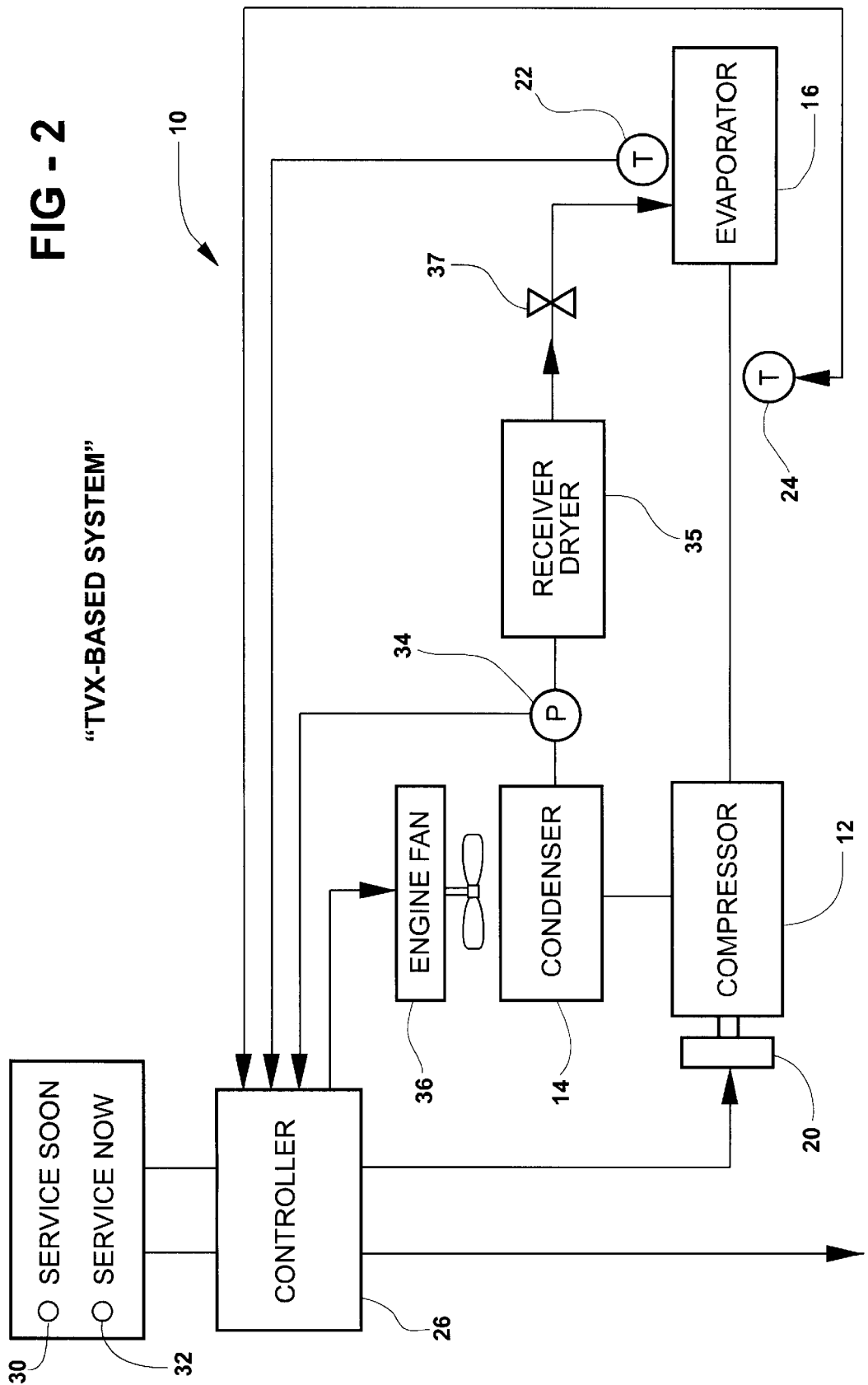
FIG. 2 is a schematic view of an alternative embodiment of the subject invention having a thermostatic expansion valve based apparatus represented as a receiver/dryer known as a CCTXV system.

An alternate embodiment of the subject invention is shown in FIG. 2 having a compressor 12, a condenser 14, a receiver-dryer 35, a thermal expansion valve 37, and an evaporator 16. The thermal expansion valve 37 is disposed between the receiver-dryer 36 and the evaporator 16. The pressure transducer 34 is located between the condenser 14 and the receiver-dryer 36. The method for determining refrigerant loss is identical for both embodiments.

Inputs from the thermistors 22, 24 and the pressure transducer 34 are filtered and converted to engineering units by the controller 26 at least two times per second. Transients are removed by converting the measurement to engineering units with the following algorithm:

$$Y_n = \alpha_1 X_n + (1-\alpha_1) Y_{n-1}$$

wherein:
 $Y_n$—filtered reading of inlet temperature, outlet temperature, or pressure
 $Y_{n-1}$—previous filtered reading of inlet temperature, outlet temperature, or pressure
 $\alpha_1$—is 0.703
 $X_n$—raw readings of inlet temperature, outlet temperature, or pressure The controller 26 is contemplated to be an 8-bit micro controller that can interface with a CAN, J1939, or a J1708/J1587 bus. This allows, the controller 26 to communicate with the display panel 28, which is located in a cab of a heavy duty truck, or a passenger compartment of a light vehicle through an existing vehicle electronic system. However, the communication busses mentioned above are not required for operation.

Four levels of refrigerant are determined by performing diagnostic calculations on the circuit measurements, full charge, medium charge, low charge, and very low charge. Diagnostic calculations are processed at least every thirty seconds. Measurements made by the thermistors 22, 24 are relayed to the controller 26. The controller 26 determines the temperature differential across the evaporator 16 by subtracting the inlet temperature from the outlet temperature. Calculating temperature differential in this fashion is indicative of refrigerant charge and requires much less computer resources than calculating superheat. However, because transients from the temperature not being in steady state can still skew the calculation results, an additional algorithm is required for improving the accuracy of the measurements.

Therefore, the temperature differential across the evaporator 16 is converted to a refrigerant charge index. The refrigerant charge index is developed from the following algorithm:

$$Ci_n = \alpha \Delta T + (1-\alpha) Ci_{n-1}$$

wherein:
 $Ci_n$—charge index
 $\Delta T$—evaporator temperature differential
 $Ci_{n-1}$—last charge index
 $\alpha$—0.1

The charge index is recalculated every thirty seconds if the compressor 12 is running continuously. Otherwise, the charge index is refreshed immediately after the compressor 12 is cycled off.

A predetermined charge index table having a plurality of charge indexes is stored within the controller 26. Each charge index corresponds to a separate range of ambient air temperatures. The range of ambient air temperature is separated into three operating conditions. The first range is an extreme operating condition of temperatures over 110° F. The second range is a normal operating condition of temperatures between 85° F. and 110° F. The third range is a cold operating condition of temperatures below 70° F. Each of the ambient temperature ranges includes a predetermined medium charge index, a predetermined low charge index, and a predetermined very low charge index. The various charge indexes can be adjusted to meet the operating specifications of a particular refrigerant circuit. A service now indicator will also signal the logics not to power up the compressor 12, thus protecting it from operating in a dangerous mode.

For determining whether the refrigerant is at a medium charge or a full charge, the calculated charge index is compared with a predetermined medium charge index and a predetermined low charge index. If the calculated charge index is greater than or equal to the predetermined medium charge index and less than the predetermined low charge index and a medium charge ten minute timer is not activated, the medium charge ten minute timer is activated. If the calculated charge index is less than the predetermined medium charge index and the medium charge timer is running, then the medium charge timer is reset. If the calculated charge index is greater than or equal to the predetermined medium charge index and the medium charge ten minute timer has expired, then a service soon indicator is activated on the display panel 28 and the medium charge timer is reset.

For determining if a low charge condition exists, the calculated charge index is compared with a predetermined low charge index and predetermined very low charge index. If the calculated charge index is greater than the predetermined low charge index and less than the predetermined very low charge index then a low charge, ten minute timer and a medium charge, ten minute timer is started. If the calculated charge index is less than the predetermined low charge index and the low charge timer is still running, then the low charge timer is reset to zero and a low charge counter is set to zero. If the calculated charge index is greater than the predetermined low charge index and less than the very low charge index, and the low charge timer has expired, and if the low charge counter is less than three, the low charge counter is incremented by one and the low charger timer is reset. Otherwise, the service soon notification provided as a visual signal on the display panel 28 will be deactivated, a service now indicator will be activated, and the low charge timer will be reset.

For determining if a very low charge condition exists, the calculated charge index is compared with a predetermined very low charge index. If the calculated charge index is greater than or equal to the predetermined very low charge index and a very low charge timer is not activated, the very low charge timer is activated and the medium charge timer is activated. If the calculated charge index is less than the predetermined very low charge index and the very low charge timer is running then the very low charge timer is reset. If the calculated charge index is greater than or equal to the predetermined very low charge index and the very low charge timer has expired, then the service soon indicator will be deactivated, a service now indicator will be activated, and the low charge timer will be reset to zero.

A complete loss of refrigerant is detected by measuring the pressure of the refrigerant in the liquid phase between the condenser 14 and the evaporator 16. If the controller 26 detects a near zero pressure, the controller 26 will terminate power to the compressor clutch 20 and activate the service now notification. Additionally, the service now notification will be activated if pressure is below a predetermined low pressure and the outlet temperature is greater than a predetermined outlet temperature. If the pressure is greater than a predetermined high pressure, the service now indicator is activated. If the slope of the curve of the temperature vs. time as the compressor 12 is cycled on is less than or equal to a predetermined slope, the service now indicator is activated. If the time between cycling the compressor 12 on and cycling the compressor 12 off is less than or equal to a predetermined time, the service now indicator is activated.

The compressor clutch 20 is cycled in response to the refrigerant temperature at the evaporator 16 inlet. If the inlet temperature is less than or equal to a predetermined clutch 20 termination temperature, the clutch 20 is stopped, deactivating the compressor 12. If the inlet temperature is greater than or equal to a predetermined clutch 20 activation temperature, the clutch 20 is started, activating the compressor 12. The time the compressor 12 is cycled on, and the time the compressor 12 is cycled off, is stored by the controller 26. The algorithm will utilize the time on and the time off to minimize rapid cycling of the compressor 12 by maintaining a consistent period of time between the time on and the time off and between the time off and the time on. By minimizing rapid cycling, the life span of the compressor 12 can be extended.

The engine fan 36 pulls air across the condenser 14 and is cycled in response to the pressure of the refrigerant in the liquid phase. If the measured pressure is greater than or equal to a predetermined fan activation pressure, the engine fan 36 is activated. If the measured pressure is less than or equal to a predetermined deactivation pressure, the engine fan 36 is deactivated.

Power is terminated to the clutch 20 in response to the pressure of the refrigerant in the liquid phase. Under extremely cold ambient temperatures, it is not necessary to operate the condenser 14. Therefore if the measured pressure is less than or equal to a predetermined extremely cold ambient pressure, and the inlet temperature is less than or equal to a predetermined extremely cold temperature, the clutch 20 will be deactivated.

The invention has been described in an illustrative manner, and it is to be understood that the terminology which has been used is intended to be in the nature of words of description rather than of limitation.

Many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method for detecting a low level of refrigerant circulating through a motor vehicle refrigerant circuit having a compressor (12), a condenser (14), and an evaporator (16), said method comprising the steps of:

detecting a partial loss of a refrigerant fluid by measuring the temperature difference of the refrigerant fluid between an evaporator inlet and an evaporator outlet; and said method characterized by detecting a complete loss of refrigerant by measuring the pressure of the refrigerant in the liquid phase between the condenser (14) and the evaporator (16).

2. A method as set forth in claim 1 further including the step of converting the temperature difference to a refrigerant charge index, determined by the formula:

$$Ci_n = \alpha \Delta T + (1-\alpha) Ci_{n-1}$$

wherein:

$Ci_n$—charge index $\Delta T$—evaporator temperature differential $Ci_{n-1}$—last charge index $\alpha$—0.1.

3. A method as set forth in claim 2 further including the step of storing a predetermined charge index table having a plurality of charge indexes stored therein, each index corresponding to a separate range of ambient air temperatures.

4. A method as set forth in claim 3 further including the step of comparing the refrigerant charge index with a predetermined charge index from the charge index table for determining a partial loss of refrigerant.

5. An assembly as set forth in claim 4 including the step of terminating power to a clutch (20) of the compressor (12) in response to said comparison between the calculated index and the predetermined index from the charge index table.

6. A method as set forth in claim 5 further including the step of cycling a clutch (20) of the compressor (12) in response to the refrigerant temperature at the evaporator inlet.

7. An assembly as set forth in claim 6 including the step of cycling an engine fan (36) for blowing air across the condenser (14) in response to the pressure of the refrigerant in the liquid phase.

8. A method as set forth in claim 7 further including the step of terminating power to the clutch (20) in response to the pressure of the refrigerant in the liquid phase.

9. A method as set forth in claim 8 further including the step of providing a visual signal in response to the comparison between the calculated charge index and the predetermined charge index.

10. A method as set forth in claim 9 wherein said step of providing a signal is further defined by providing a visual signal of service soon for indicating a partial loss of refrigerant and service now for indicating a critical loss of refrigerant.

11. A method as set forth in claim 10 further including the step of monitoring the time the compressor (12) is cycled on and cycled off for minimizing rapid cycling of the compressor.

* * * * *